(12) United States Patent
Gacitùa Cavagnaro

(10) Patent No.: US 11,376,107 B2
(45) Date of Patent: Jul. 5, 2022

(54) ELECTRIC TOOTHBRUSH THAT PROVIDES HIGHLY EFFECTIVE LONGITUDINAL MOVEMENT AND COMPLETELY ELIMINATES THE RISK OF TRAUMAS CAUSED BY THE FREE END OR TIP OF THE BRUSH

(71) Applicant: Carlos Javier Gacitùa Cavagnaro, Metropolitana (CL)

(72) Inventor: Carlos Javier Gacitùa Cavagnaro, Metropolitana (CL)

(*) Notice: Subject to any disclaimer, the term of this patent is extended or adjusted under 35 U.S.C. 154(b) by 368 days.

(21) Appl. No.: 16/625,646

(22) PCT Filed: May 25, 2018

(86) PCT No.: PCT/CL2018/000016
§ 371 (c)(1),
(2) Date: Dec. 20, 2019

(87) PCT Pub. No.: WO2018/232542
PCT Pub. Date: Dec. 27, 2018

(65) Prior Publication Data
US 2021/0153990 A1 May 27, 2021

(30) Foreign Application Priority Data
Jun. 22, 2017 (CL) .................................. 1662-2017

(51) Int. Cl.
*A61C 17/34* (2006.01)

(52) U.S. Cl.
CPC ........ *A61C 17/3472* (2013.01); *A61C 17/349* (2013.01); *A61C 17/3418* (2013.01); *A61C 17/3445* (2013.01)

(58) Field of Classification Search
CPC ............ A61C 17/3472; A61C 17/3445; A61C 17/349; A61C 17/3436
See application file for complete search history.

(56) References Cited

U.S. PATENT DOCUMENTS

| 4,156,620 A | 5/1979 | Clemens |
| 4,989,287 A | 2/1991 | Scherer |
| 2006/0254006 A1 | 11/2006 | Blaustein et al. |
| 2008/0078040 A1 | 4/2008 | Braun |
| 2008/0271271 A1 | 11/2008 | Chan |
| 2014/0230169 A1 | 8/2014 | Farrell et al. |

FOREIGN PATENT DOCUMENTS

| KR | 20090041852 | 4/2009 |
| KR | 201101503 U | 2/2011 |

OTHER PUBLICATIONS

International Search Report issued in PCT/CL2018/000016 dated Sep. 12, 2018.

*Primary Examiner* — Shay Karls

(57) ABSTRACT

The invention relates to an electric toothbrush provided with longitudinal, also called axial, oscillating movement that occurs at the active end of the bristle plumes, or nylon filaments, without the end or tip of the brush causing potentially traumatic blows, which represent an undesired risk, as still occurs according to the existing prior art.

10 Claims, 4 Drawing Sheets

ELECTRIC TOOTHBRUSH THAT PROVIDES HIGHLY EFFECTIVE LONGITUDINAL MOVEMENT AND COMPLETELY ELIMINATES THE RISK OF TRAUMAS CAUSED BY THE FREE END OR TIP OF THE BRUSH

BACKGROUND OF THE INVENTION

Field of the Invention

The field of this invention falls within the scope of professional dentistry, specifically the area of dental hygiene and electrical toothbrushes.

Description of the Prior Art

The first toothbrush made in Switzerland in 1954, which is still available today, although with low market penetration, from the brand BROXO, has a small head which is powered by a motor that lends it an oscillating angular-type movement. This 90-degree opposite movement with respect to the axial movement proposed in this application turns out to be less stable and adapts less easily to the shape of teeth and their interproximal anfractuosities, something which is fundamental for the removal of Dental Biofilm (DB) or Bacterial Plaque (BP). It transpires that the axial movement is clearly more stable and permits better penetration in the valleys and depressions of the interdental zones and near the gingival sulcus. In addition, the BROXO brush has a small contact surface against the teeth which corresponds to approximately half that of a conventional brush defined by the A.D.A. (American Dental Association), disadvantageously causing an increase in pressure, since this pressure is inversely proportional to the surface area (pressure=force/area), and also makes brushing slower and therefore more time- and energy-consuming.

We also have the utility model no. 2012-002572 as prior art whose state of the art offers purely axial movement. Another electric toothbrush found mostly in the US market is the so-called "INTERPLAK" which has a small head having only two parallel runs with four plumes each. Each of these plumes moves angularly oscillating around their own axis, activated by a gear system. Its small surface area makes the work more arduous and slower and it is more energy-consuming because it has too many high-travel gears so the battery charge is not always sufficient for a complete dental health formula, and the way in which its bristles move has proven to be of low effectiveness in terms of the removal of dental biofilm (DB).

Other electric toothbrushes with a significant presence in the current market are of the "sonic" type, common to brands such as PHILLIPS, PHB, COLGATE, etc., consisting of heads with bristles that vibrate within sonic ranges, hence their name. They perform better than a manual brush, but vibration alone is insufficient in terms of what can be expected from an electrically powered instrument since the dental biofilm—despite being relatively soft—is highly adherent and difficult to disintegrate and remove from the dental surfaces due to its chemical composition and due to the locations where it is preferably formed being difficult to access, so it requires significant mechanical work, superior to simply vibration within the sonic range. The ultrasonic range is very effective but is restricted to professional use only.

In the 90s the German brand BRAUN designed an electric toothbrush which consists of a head with a circular platform, support for the nylon bristles, which moves angularly in an oscillating manner. Given the small surface area of the head, the work is much slower, and the more they increase the diameter of the platform in an attempt to solve this problem, the greater the damage that occurs on hard and soft tissues (teeth and gums) since the bristles on the periphery travel a greater distance, up to 5 or 6 mm, with a significant highly adverse abrasive effect. All brushing techniques that are widely recognised and recommended by specialists share the characteristic that the movements of the plumes should be short, within a range not greater than 2 to 4 mm to minimise the abrasive effects of any toothbrush. Other patents for electric toothbrushes that can be cited but which differ completely from the proposed invention are the following:

ES2145771, which refers to a dental hygiene device for cleaning teeth and interdental and gingival areas, comprising: a body piece that includes a mounted arm for movement; a set of bristles having free ends, the set of bristles being located in the vicinity of one end of the arm; and means in the body piece that are operable to move the arm and thereby the set of bristles, characterised in that said means are operable to move the arm in such a way that the tips of the bristles move at a speed greater than approximately 1.5 metres per second, which is sufficient to produce a cleaning action with a liquid dentifrice beyond the tips of the bristles.

U.S. Pat. No. 8,990,991, which refers to a head (14) that includes a neck portion (15) that connects a proximal end thereof to a section of the handle (12) of a powered toothbrush (10), at the distal end of the neck portion is a brush member (16, 28) that includes a bristle base plate (18, 34) and a field of bristles (20, 36) mounted thereon, an eccentric cam (30) is mounted to rotate the action around the bristle base plate, located in the middle of the field of bristles, an eccentric bristle field (38) is mounted on the eccentric cam. The movement of the brush member is produced by a set of drive units, where the toothbrush creates turning movement of the eccentric cam and the eccentric bristle field mounted thereon, resulting in additional oral cleaning action.

BRIEF DESCRIPTION OF THE FIGURES

For a better understanding of the essential features of the invention of an electric toothbrush with longitudinal or axial oscillating movement, provided with a mechanism that has a head with a variable number of platforms bearing independent bristle plumes, it will be described in conjunction with the figures, which form an integral part of this invention, without this restricting obvious modifications that may arise, wherein.

DETAILED DESCRIPTION OF THE INVENTION

Figure 1:
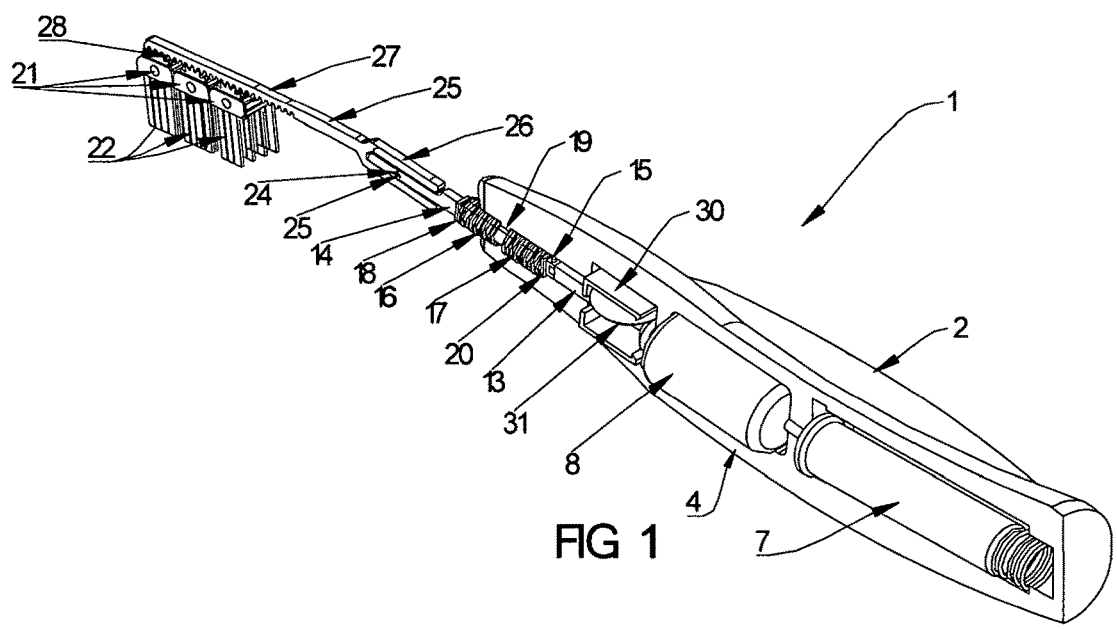
FIG. 1 provides an isometric longitudinal sectional view of the electric toothbrush of the invention, housing inside it the axial movement mechanism for several platforms bearing bristle plumes.
Figure 2:
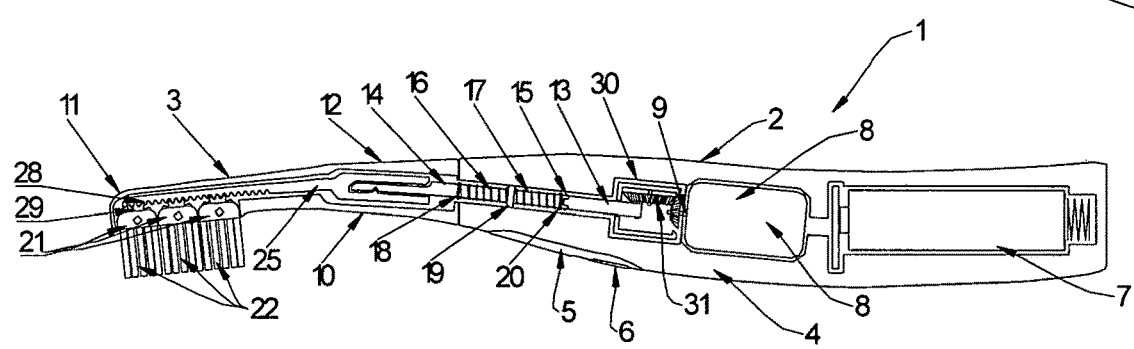
FIG. 2 provides an elevation or raised longitudinal sectional view of the electric toothbrush of the invention, housing inside it the system for the axial movement of the platforms bearing bristle plumes.
Figure 3:
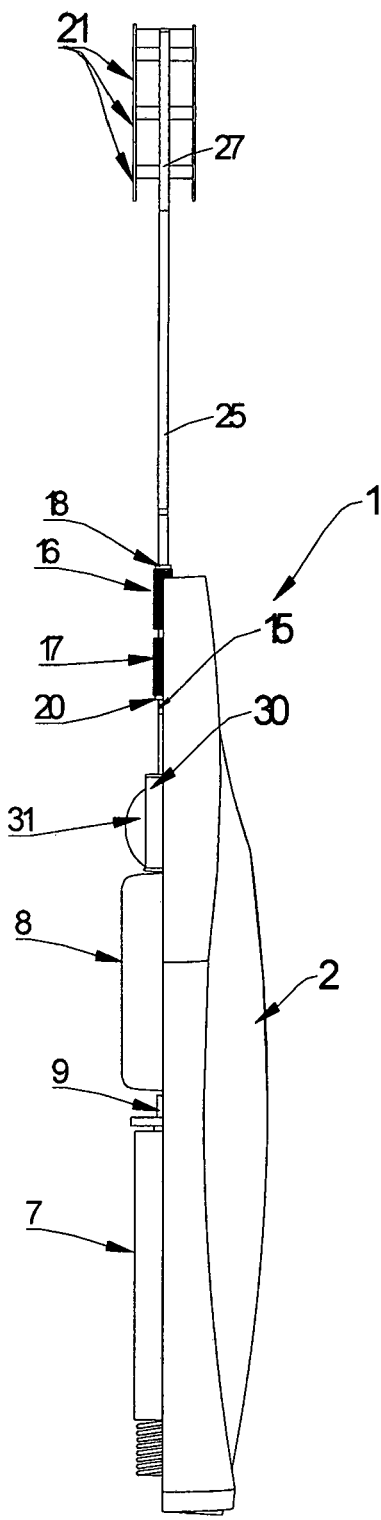
FIG. 3 provides a top isometric view with the uncovered half of the electric toothbrush of the invention, housing inside it the mechanism for achieving axial movement of the platforms bearing bristle plumes.
Figure 4:
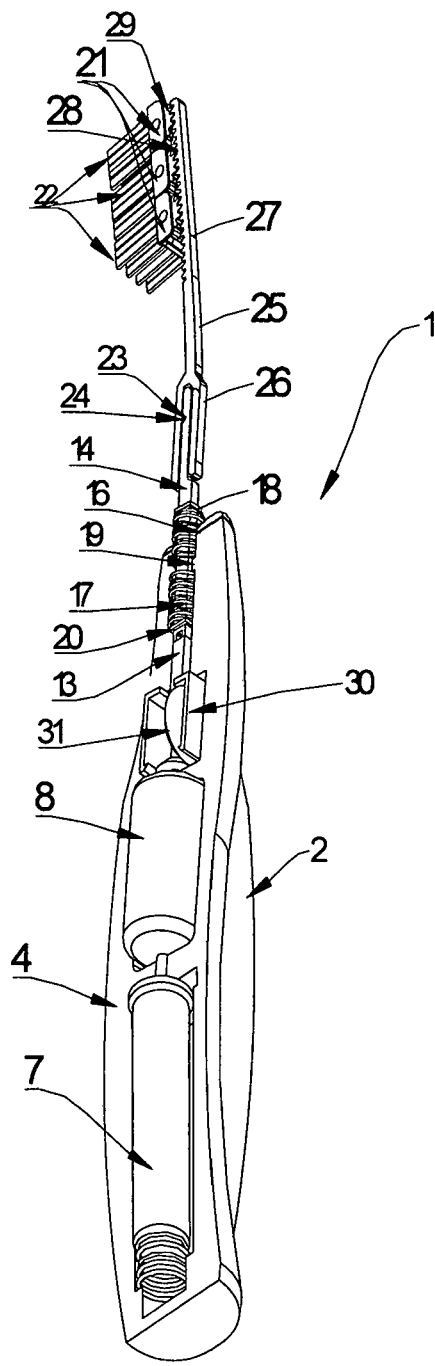
FIG. 4 shows another lateral isometric longitudinal sectional view of the handle of the electric toothbrush of the invention, with the system for generating the axial movement of the platforms bearing the bristle plumes.
Figure 5:
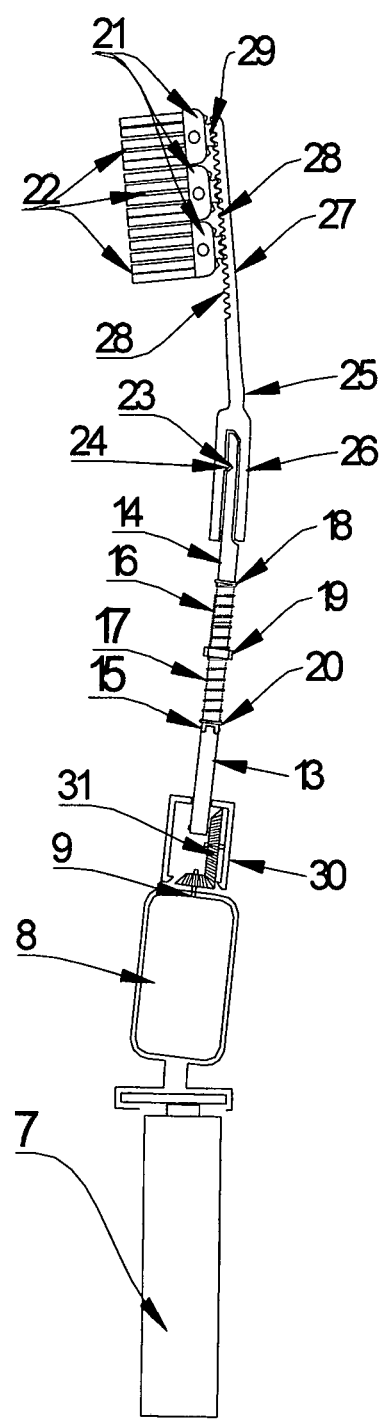
FIG. 5 shows a lateral elevation view of all the means that make up the axial or longitudinal movement mechanism for the electric toothbrush of the invention.

The solution to the problem of potential trauma found in a toothbrush provided with purely axial movement is achieved by means of the mechanism from this invention, which consists of a system of multiple mobile platforms, arranged transversely within a housing that forms the head of the brush, which rotate around their axis with a longitudinal angular oscillating movement, allowing the plumes of nylon filaments inserted therein to move axially by their free or active ends, while at their base they only rotate, lacking longitudinal displacement in that area. These mobile platforms connect with the housing by means of two cross shafts on each side, intended for the anchoring, spacing and rotation of said platforms, lending them an angular movement of axial oscillation which causes the nylon filament plumes to move drawing an arc whose line is parallel to the main shaft of the instrument, that is, while the free or active end of the nylon filaments move back and forth as required; on the other hand, the opposite end of the filament, inserted in the platforms, only rotates angularly, completely lacking longitudinal displacement movement, whereby it is possible to clear this component of unwanted forces at the end or tip of the brush.

The axial movement of the bristle plumes is particularly effective and efficient and that is why it is the fundamental basis of movement in the main manual brushing techniques recommended worldwide by specialists today, as is the case in the Bass, Stillman, 45" and other techniques, and this is the basis of this innovative electrically driven toothbrush instrument which is not present in the market and nor have invention patents with similar characteristics been found in the searches performed, except the utility model mentioned which this invention aims to substantially improve by making it an instrument designed to render it atraumatic, efficient and risk free.

This particular efficacy attributable to the axial movement of the toothbrush is due to the fact that when the filament plumes are moved longitudinally, or also axially, and are applied against the surface of the bacterial plaque that forms in the anatomical anfractuosities of teeth and gums, the filaments tend to become trapped inside the sinuous cavities of said anatomy, they become cloistered in them and acquire movement that is undulatory, striking, against the stable surface structure of the bacterial plaque, breaking it and disintegrating it more efficiently than with the electric toothbrushes available currently, which is the final objective of the instrument and its function.

The angular oscillating movement of the plume-bearing platforms is achieved with the drive of a rack-type shaft, arranged longitudinally inside the brush head, between the housing and the rear section of the plume-bearing platforms. This shaft moves with a longitudinal oscillating movement and is connected to the platforms via a corresponding standard gear, located so that it forms a body with the internal or dorsal face of the plume-bearing platforms and these platforms acquire the required angular movement, with the actuation of said longitudinal oscillating shaft.

This shaft, in turn, is connected at the other end to an electric motor located inside the other component of the instrument, the handle, which houses the motor and a box for converting movement from rotational to longitudinal through the use of bevel gears placed at 90 degrees from each other, one of which is connected to the motor and the other of which has a central shaft around which it rotates and an eccentric shaft that connects to a connecting rod. This connecting rod, at its other end, drives a shaft that acquires purely longitudinal oscillating movement. This last shaft has an attachment at the end opposite to the connecting rod designed to connect with the aforementioned rack-type shaft of the head in order to transmit its resulting longitudinal movement thereto. On the other hand, before protruding from the handle, the shaft connected to the connecting rod has a centring system with two springs around it, opposite each other and semi-compressed, separated by a partition fixed to the housing of the handle, which brings about the braking of the motor in a position such that the plumes, when the instrument is idle, are always in a position that is harmoniously perpendicular to the head.

An important alternative for driving the platforms bearing bristle plumes is a continuously rotating shaft system, provided with inclined or oblique grooves called front cams, arranged at the end that connects with the platforms and located internally inside the housing, in order to obtain the same movement in a more simplified manner, eliminating annoying vibrations and consuming less energy. Likewise, the drive of the platforms can be optionally achieved with a solenoid-type motor with integrated counterweights and a longitudinally driven, rack-type transmission shaft.

On the other hand, it is important to highlight that for the head and for all its parts and pieces that form it, since it is designed to work in a highly septic environment, all the polymers with which it is manufactured have copper nanoparticles in the masterbatch prior to injection, with the aim of lending the instrument proven antimicrobial properties.

In sum, the whole of this invention manages to use, electro-mechanically, a suitable axial movement at the active end of the nylon filaments of the toothbrush, without the end or tip of the head moving longitudinally, but remaining completely stationary and atraumatic, thus achieving particularly effective performance, with total safety for the user.

Technical Solution from the Odontological Point of View.

The benefits of axial movement have been acknowledged, however there are currently no electric toothbrushes to sufficiently embody it without risk to the teeth.

This invention consists of a mechanism designed in order to preserve this axial movement, which is particularly effective, solving the main problem that these electric toothbrushes have, which is the potentially traumatic effect caused by the end or tip of the instrument when its movement is activated.

The main dental brushing techniques widely distributed and currently promoted by the majority within the international community of dentists: The Bass Technique and its variation the Modified Bass Technique, which along with Dr Stillman's notable alternative, known as the Stillman Technique and its variation the Modified Stillman Technique, as well as the 45° Technique, all of them of widely accepted and used, share the common feature of short mesial-distal movement or of longitudinal oscillation or simply called axial movement. This invention can be used to obtain said axial movement electro-mechanically, though devoid of potential traumatic effects on soft and hard tissues caused by the end or tip of the brush moving quickly.

It is important to emphasise that the axial or longitudinal oscillating movement is common to the main manual brushing techniques that are widely advocated, however, despite its prevalence, it is not available in any of the electric toothbrushes currently found in the current prior art, nor in the market, since these are not capable of reproducing this movement, with the exception of utility model no. 2012-002572 which this invention improves substantially, to the point of having created a totally atraumatic electric toothbrush through the mechanical ingenuity described above which removes the potential risk of damage and wounds, greatly facilitating the arduous task of correct tooth brushing, saving time, obtaining a result that is closer to being the best result and in a reliably atraumatic way.

The head of the invention, unlike other existing brushes, has an active surface of almost twice the size of the BROXO model so it distributes forces better, avoiding excessive pressure, thus considerably reducing working time and the risk of abrasions, the most relevant feature being its axial movement, with the aim of electro-mechanically providing the movement required by the brushing techniques currently recommended within the international dental community.

The axial electric toothbrush of this invention was created with the purpose of improving and solving the problems that currently exist; the controlled movement of the brush head allows the least possible damage to the hard and soft tissues because it is made up of extra-soft Tynex filaments with rounded ends, also providing a large head size to distribute forces better, thus avoiding excessive pressure and simultaneously offering better performance in terms of better removal of dental biofilm (DB) in less time because it has system of platforms that move in the axial direction which is the most efficient brushing movement advocated by the most widely recommended dental brushing techniques in the world today.

There are many types of electric toothbrush, however they have not proven to be very efficient in terms of bacterial plaque removal, so they are mainly recommended to people with motor deficiencies. Utility model no. 2012-002572 includes axial movement, however, according to its components, there is a serious potential risk of trauma caused by the free end of the base that supports the filament plumes, against structures such as teeth and devices fixed to teeth such as bridges and crowns and even more so against soft tissues such as gums and mucous membranes that cover the alveolar bone and other bone structures such as: the anterior border of the ramus of the mandible, the zygomatico-alveolar crest, the anterior nasal spine, the canine and other eminences.

Aim of the Invention.

The aim of this invention, for an electrically driven toothbrush, is to achieve the use of axial movement, which is common to the main dental brushing techniques, solving the potential risk of trauma to the oral cavity of the user caused by the end or tip of the base head that supports the plumes of nylon filaments, so as to obtain safe and effective tooth brushing.

Detailed Description of the Invention According to the Figures.

As can be seen in FIGS. 1 to 6, the invention for an electric toothbrush (1) consists of a mechanism for axial movement or longitudinal oscillating movement, formed by an ergonomic gripping handle (2) to which an upper head (3) is attached containing platforms bearing bristle plumes with axial movement.

The gripping handle (2) is constituted by a hollow internal housing (4) made of injected ABS which has an on/off switch (5) externally; a three-position speed controller with indicator lights (6), blue for low speed, green for medium speed and yellow for high speed; a charge indicator display for an internal rechargeable battery (7); an electric motor (8), generally of the micromotor type with direct current or of the solenoid type with counterweights, with a device for converting rotational movement to integrated axial movement (30), ending in an shaft (14) with axial-type movement which protrudes from said handle (2) and allows for coupling and engagement with the upper head (3) of the electric toothbrush (1) which is the active part of the axial movement system or mechanism of the invention.

The head (3), manufactured entirely with an additive or masterbatch of copper nano-particles, is composed of an irregularly shaped and symmetrical housing (10) with a hollow interior consisting of two parts: the main part, a head that houses several platforms bearing bristle plumes (21) that move angularly in an axial direction, followed by a neck (12) that houses the transmission shaft driving the axial movement (25) of said platforms (21). The handle (2) of the electric toothbrush (1) contains a connecting rod (13) which is connected to the transmission shaft (14) by means of a bolt that crosses them transversely (15); said transmission shaft (14) has a compression spring (16) and a counter spring (17), which are stopped by an upper stop (18), by an intermediate partition (19) fixed to the handle (2) of the electric toothbrush (1) and by a lower stop (20), all of which allows the independent platforms (21) bearing bristle plumes of nylon filaments (22) to be centred in an idle position; furthermore, said transmission shaft (14) has a groove (23) at its emergent end which fits with a protrusion (24) and both constitute the coupling system. The shaft (25) is formed on the one hand by a body (26) with a "Y"-shaped configuration, followed by an oblong elongated body (27) provided with a rack (28) at its perimetral end which engages with gears (29) that each independent platform (21) bearing plumes of cleaning bristles (22) located on its dorsal surface has; these platforms are anchored to the housing (11) and receive the axial or longitudinal oscillating movement by means of the movement converter (30) which preferably consists of a system of bevel gears (31) which are connected to the electric motor (8) and which are located in the upper area of the handle (2) of the electric toothbrush (1).

The platforms (21) bearing bristles (22), occasionally six in number, regularly five, normally four and ideally three, contain cells defined as cylindric holes, in variable numbers, from ten to twenty, with a diameter also varying from 1.2 to 1.8 mm, and ideally 1.4 mm, for the housing of the bristle plumes or Tynex filaments of 0.009", 0.008", 0.007" and ideally 0.006" in diameter and generally 9, 10 or 11 mm in length. Said platforms (21) are arranged so that they are aligned transversely on the head (11), provided with two protruding shafts on each one, on both sides of its lateral walls, which fit in the bushings located correspondingly on the lateral walls of said head (11) of the electric toothbrush (1) so that when they are moved by the gear system (29) and rack (28), they acquire a longitudinal or oscillating axial movement, by means of which the bristle plumes of cleaning filaments (22) move drawing an arc with an extension of approximately 1, 2 or 3 mm on each side of the notionally constructed line perpendicular to the centre of the platforms (21) in an idle state. The line of said arc turns out to be parallel to the main shaft of the instrument so that the bristle plumes of cleaning filament (22) move in an axial direction when activated by the motor (8) and the transmission system. It is therefore possible to remove the bacterial plaque more efficiently than with the existing brushes in the current prior art.

Figure 6:
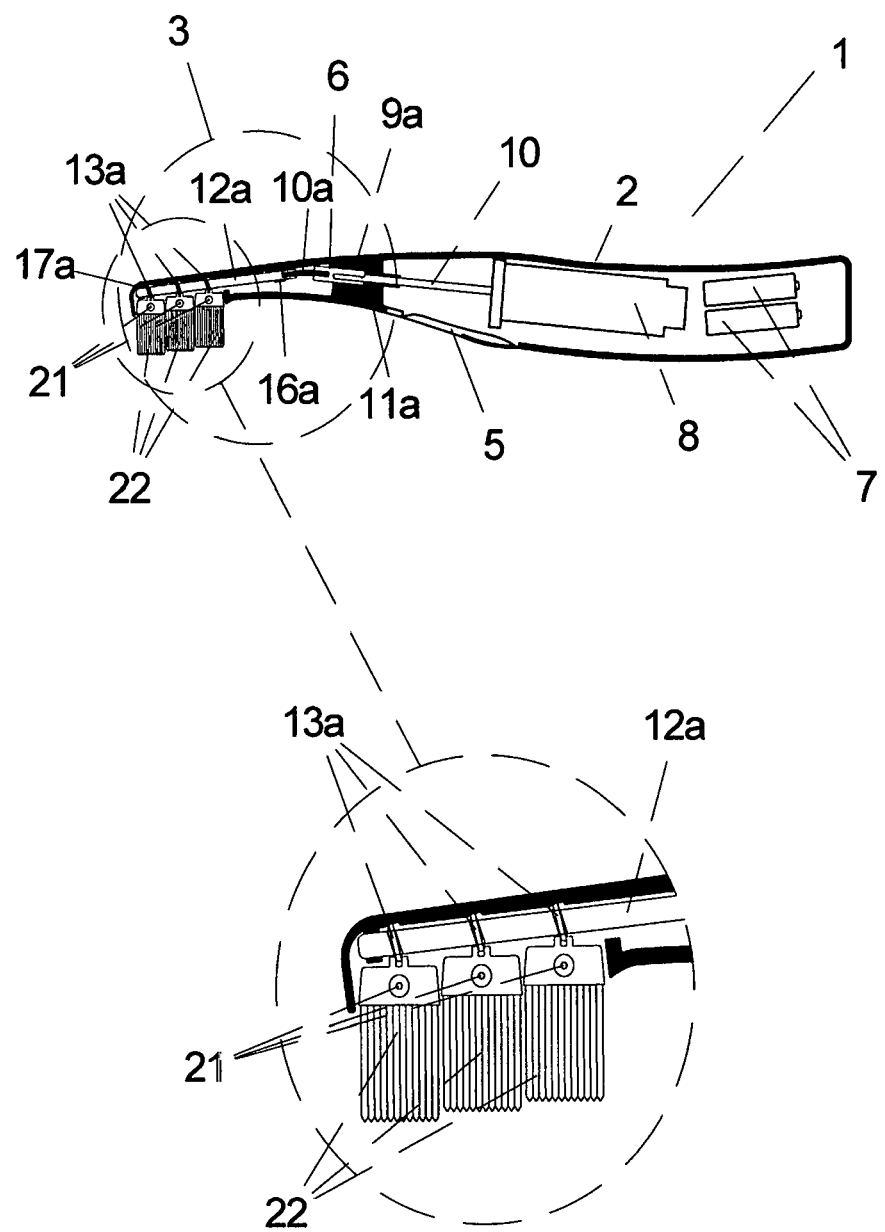
FIG. 6 shows a longitudinal sectional view of an electric toothbrush, with alternative means for producing the axial movement of the platforms bearing the bristle plumes of the head, consisting of a continuously rotating shaft with front cams and further details of the inside of the head of the electric toothbrush.

With regard to FIG. 6, the toothbrush (1) with alternative means for producing the axial movement of the platforms (21) bearing plumes (22) is formed by a gripping handle (2), which in turn is constituted by a hollow internal housing (4) of injected ABS polymer, which externally contains an on/off switch (5), a three-position speed controller with indicator lights (6) (blue for low speed, green for medium speed and yellow for high speed), a charge indicator display (not shown) for some batteries, and internally contains the rechargeable battery (7) of AAA size or alternatively AA size, an electric motor of the rotary micromotor type with direct current (8) which is coupled with a drive shaft (6a) that rotates in a support bushing (9a) made of injected nylon 6; said drive shaft (6) is connected with a flexible smaller shaft made of polyurethane material (10a) and this in turn is connected with a continuously rotating driven shaft (12a) made of injected polyacetal material which is provided with three tilted front cams (13a) separated so as to be equidistant to each other and connected via the internal area of the platforms (21) bearing plumes (22). The driven shaft (12a) is supported by two bushings (16a) and (17a) and also made of injected nylon 6 material (6).

The continuously rotating motor (8), by means of its own shaft (10), transmits its rotation to the drive shaft (6) which rotates both the flexible smaller shaft (10a) and the continuously rotating driven shaft (12a); the latter is provided with front cams (13a) that are connected to each of the platforms (21), thus achieving the axial or oscillating movement of the plumes (22) of the electric toothbrush. All the components of the head (3) have an additive in the polymer masterbatch based on copper nano-particles, in order to lend it antimicrobial characteristics.

What is claimed is:

1. An electric toothbrush with a mechanism for axial movement or longitudinal oscillating movement, with a head bearing bristle plumes without producing a potentially traumatic effect on the soft and hard tissues of the oral cavity caused by the end or tip of the brush during said axial movement; wherein the electric toothbrush is comprised of an ergonomic gripping handle (2), followed by an upper head (3) made entirely of polymers that have antimicrobial additive based on copper nano-particles, CHARACTERISED in that the hollow head (3) and the handle (2) of the electric toothbrush (1) contain: a connecting rod (13) which is connected to a transmission shaft (14) by means of a bolt that crosses them transversely (15); said transmission shaft (14) has a compression spring (16) and a counter spring (17) which are stopped by an upper stop (18), an intermediate partition (19) corresponding to the handle (2) of the electric toothbrush (1) and a lower stop (20), which allow independent platforms (21) bearing plumes or filament bristles (22) to be centred in an idle position; furthermore, said transmission shaft (14) has an end groove, which fits with a protrusion (24) that an axial movement transmission shaft has (25), which is formed by an end with a "Y"-shaped configuration (26), followed by an oblong elongated body (27) provided with a rack (28) at its upper end which engages with gears that form part of the independent platforms (21) bearing plumes or cleaning bristles (22) which are arranged on said head (11); axial or longitudinal oscillating movement is transmitted thereto, by means of a movement converter (30), which preferably consists of a system of bevel gears (31) which are connected with a rotary electric motor (8) located in the upper area of the handle (2) of the electric toothbrush (1).

2. The electric toothbrush (1) with a mechanism for axial movement or longitudinal oscillating movement, according to claim 1, CHARACTERISED in that the platforms (21), occasionally six in number, regularly five, normally four and ideally three, wherein each platform bearing bristles (22), contain cells defined as cylindric holes with a diameter also varying from 1.2 to 1.8 mm, and ideally 1.4 mm, in variable numbers, from ten to twenty, for the housing of the plumes of Tynex filaments of 0.009", 0.008", 0.007" and ideally 0.006" in diameter and generally 9, 10 or 11 mm in length.

3. The electric toothbrush (1), with a mechanism for axial movement or longitudinal oscillating movement of a head bearing bristle plumes, according to claim 2, CHARACTERISED in that the head (3) of the electric toothbrush is manufactured with an integration of copper nano-particles into the masterbatch of the polymers that make up all its parts, lending the electric toothbrush a significant recognised antibacterial property.

4. The electric toothbrush (1) with a mechanism for axial movement or longitudinal oscillating movement, according to claim 1, CHARACTERISED in that said platforms (21) are arranged transversely on the head (11) provided with a protruding shaft on both sides of the lateral walls of said platforms (21), which fit into internal holes in the head or housing (11) of the electric toothbrush (1), so that when they are moved by the axial movement transmission shaft (25), they acquire an axial or longitudinal oscillating movement, by means of which the plumes or bristles of cleaning filaments (22) move drawing an arc with an extension of approximately 1, 2 or 3 mm on each side of a notionally constructed line perpendicular to the centre of the platforms (21) in an idle state; line of said arc turns out to be parallel to the main shaft of the electric toothbrush so that the plumes or cleaning filament bristles (22) move in an axial direction when activated by the motor (8) and the transmission system as well as the connecting rod (13), transmission shaft (14) and gear system (25), which manages to remove bacterial plaque more efficiently.

5. The electric toothbrush (1), with a mechanism for axial movement or longitudinal oscillating movement of a head bearing bristle plumes, according to claim 4, CHARACTERISED in that the head (3) of the electric toothbrush is manufactured with an integration of copper nano-particles into the masterbatch of the polymers that make up all its parts, lending the electric toothbrush a significant recognised antibacterial property.

6. The electric toothbrush (1) with a mechanism for axial movement or longitudinal oscillating movement, according to claim 1, CHARACTERISED in that the electric motor (8), preferably of the micromotor type with direct current or potentially of the solenoid type with counterweights, with a device for converting rotational movement to integrated axial movement (30), in both types of motor ending in an shaft (14) with axial-type movement, which protrudes from said handle (2) and allows for coupling and engaging with the upper head (3) of the electric toothbrush (1), which is the active part of the axial movement system or mechanism of the invention.

7. The electric toothbrush (1), with a mechanism for axial movement or longitudinal oscillating movement of a head bearing bristle plumes, according to claim 6, CHARACTERISED in that the head (3) of the electric toothbrush is manufactured with an integration of copper nano-particles into the masterbatch of the polymers that make up all its parts, lending the electric toothbrush a significant recognised antibacterial property.

8. The electric toothbrush with a mechanism for axial movement or longitudinal oscillating movement, according to claim 1, CHARACTERISED in that it has rechargeable batteries (7) of size AAA or AA; a continuously rotating electric motor (8) of the micromotor type with direct current whose shaft (10) is coupled with a drive shaft (6 a) which rotates within an injected nylon 6 bushing (9 a) which is housed in an insert (11 a) which is in turn fixed to the housing of the head (3), said drive shaft (6 a) connects with a flexible smaller shaft made of polyurethane material (10 a) and this in turn connects with a continuously rotating driven shaft (12 a) made of injected polyacetal material which is provided with three cams or tilted grooves (13 a) separated so as to be equidistant to each other and connected by an internal area of the platforms (21) bearing plumes (22); the continuously rotating driven shaft (12 a) is supported by two bushings (16 a) and (17 a) that are separated and also made of injected nylon 6 material (6).

9. The electric toothbrush (1), with a mechanism for axial movement or longitudinal oscillating movement of a head bearing bristle plumes, according to claim 8, CHARACTERISED in that the head (3) of the electric toothbrush is manufactured with an integration of copper nano-particles into the masterbatch of the polymers that make up all its parts, lending the electric toothbrush a significant recognised antibacterial property.

10. The electric toothbrush (1), with a mechanism for axial movement or longitudinal oscillating movement of a head bearing bristle plumes, according to claim 1, CHARACTERISED in that the head (3) of the electric toothbrush is manufactured with an integration of copper nano-particles into the masterbatch of the polymers that make up all its parts, lending the electric toothbrush a significant recognised antibacterial property.

* * * * *